United States Patent [19]
Klein et al.

[11] Patent Number: 5,527,021
[45] Date of Patent: Jun. 18, 1996

[54] TWO OUTPUT VEHICLE SUSPENSION SOLENOID

[75] Inventors: Joel F. Klein, Sterling; Dean E. Ankney, Chana, both of Ill.

[73] Assignee: Borg-Warner Automotive, Inc., Sterling Heights, Mich.

[21] Appl. No.: 350,681

[22] Filed: Dec. 7, 1994

[51] Int. Cl.$^6$ ................................................. B60G 17/00
[52] U.S. Cl. ................................................. 267/64.16
[58] Field of Search ........................ 267/64.16, 64.18; 180/41; 280/840, 6.1, 6.11, 6.12, 714, DIG. 1

[56] References Cited

U.S. PATENT DOCUMENTS

| | | | |
|---|---|---|---|
| 3,610,611 | 10/1971 | Elliott | 267/64.18 |
| 4,702,490 | 10/1987 | Yamaguchi | 267/64.16 |
| 5,048,867 | 9/1991 | Gradert | 280/DIG. 1 |
| 5,217,246 | 6/1993 | Williams | 280/DIG. 1 |

Primary Examiner—Robert J. Oberleitner
Assistant Examiner—C. T. Bartz
Attorney, Agent, or Firm—Brooks & Kushman; Greg Dziegielewski

[57] ABSTRACT

A suspension system for leveling vehicles with differing loads. A solenoid with two armatures regulating two valve mechanisms is positioned between a compressor and a pair of suspension springs. Activation of the solenoid opens the two valve mechanisms allowing fluid to flow from the compressor to the two suspension springs. Deactivation of the solenoid closes the two valve mechanisms and isolates the two suspension springs from one another, as well as from the compressor position sensors connected to the electronic control system of the vehicle initiate activation of the solenoid as required.

2 Claims, 3 Drawing Sheets

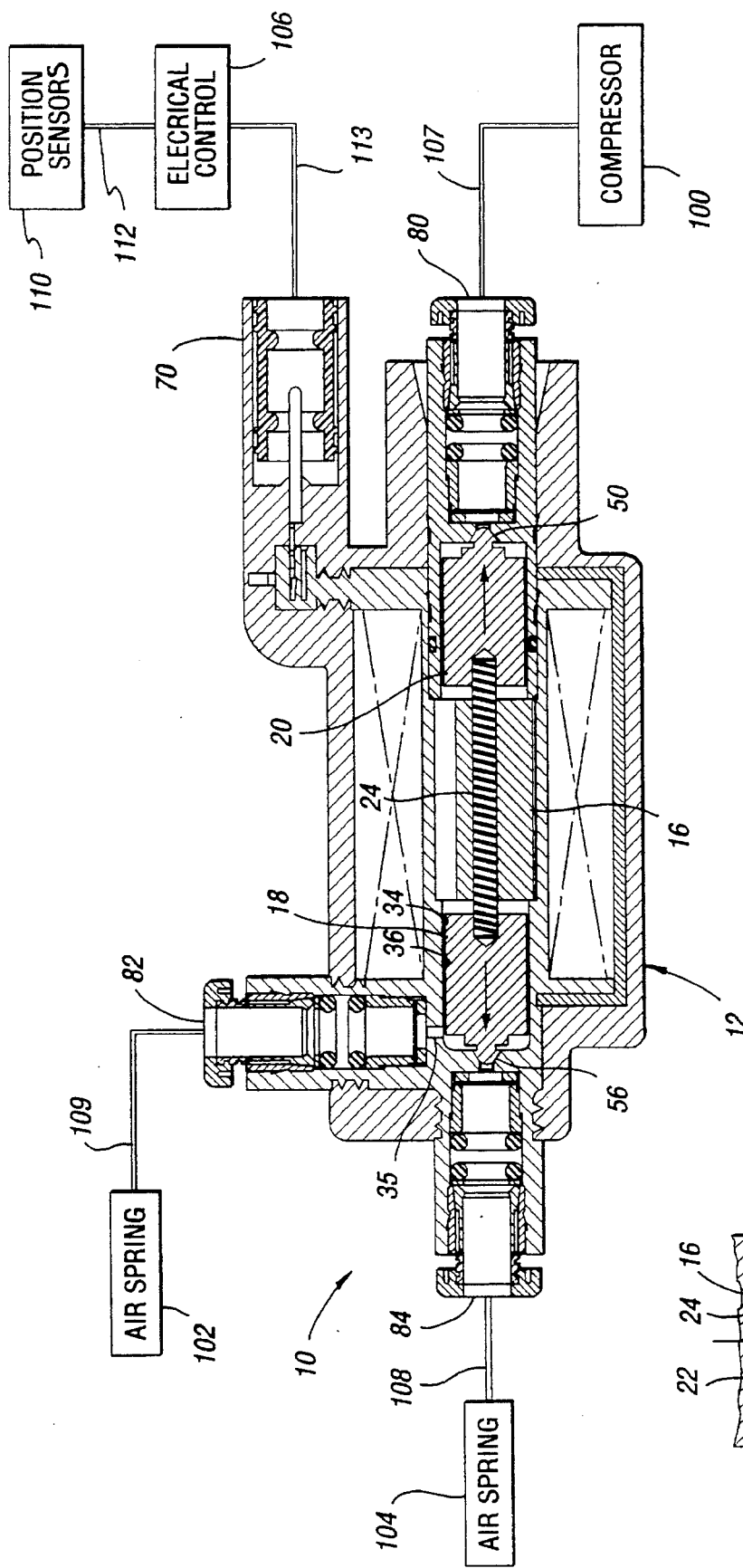
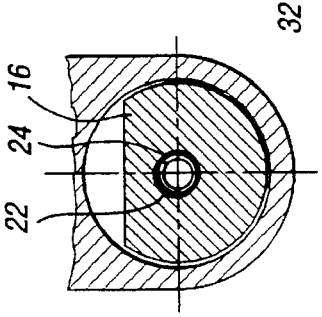
Fig. 3
Fig. 4

TWO OUTPUT VEHICLE SUSPENSION SOLENOID

TECHNICAL FIELD

The present invention relates to electronically operated fluid suspension systems for vehicles, particularly pick-up trucks. A solenoid device controls the flow of fluid into the suspension springs.

BACKGROUND OF THE INVENTION

Air suspension systems for leveling vehicles with loads are known. Such systems are particularly useful for pick-up trucks and other vehicles which carry heavy loads, although they also have been used for automobiles.

The present systems are either manually or automatically operated. With manually operated systems, the vehicle suspension systems are adjusted by manual introduction of fluid, particularly hydraulic or pneumatic fluid, into the suspension systems. With automatic systems, solenoids or similar devices triggered by position sensors control the wheel suspension systems through the electronic control system of the vehicles.

It is an object of the present invention to provide an improved load leveling system for a vehicle. It is another object of the present invention to provide an air suspension system for a vehicle which automatically operates to level a vehicle when subjected to differing loads.

It is a further object of the present invention to provide a system for leveling the load of a vehicle which is less expensive and easier to operate than known systems. It is a still further object of the present invention to provide an air suspension load leveling system which operates a pair of wheels simultaneously.

These and other objects, features and benefits of the invention will become apparent from the following description when viewed in accordance with the accompanying drawings and appended claims.

SUMMARY OF THE INVENTION

The present invention provides an air or fluid suspension system for leveling the load of a vehicle in which both sides of the vehicle are controlled by a single device rather than two separate ones. A housing containing a solenoid with two armatures controls flow from an air supply to a pair of air springs.

When the solenoid is energized, air from the compressor is allowed to pass through the device and be simultaneously delivered to the two air springs position sensors attached to the vehicle control the solenoid electronically. When the desired vehicle height is reached, other sensors deactivate the solenoid and the two air springs are sealed from the compressor supply.

With the present invention, a pair of armatures are energized by a single solenoid. When the solenoid is not energized, the armatures are biased by a spring to seal passageways leading from the compressor into at least one of the air springs. The two air springs are also isolated from one another, the level of isolation being determined by the spring force.

The armatures are positioned on opposite sides of a pole piece or tube and are biased outwardly by a spring or biasing means. When the solenoid is energized, the two armatures are simultaneously withdrawn inwardly toward the pole piece opening the passageways.

DESCRIPTION OF THE DRAWINGS

FIG. 3 illustrates the system of FIG. 2 when the solenoid is not energized; and

FIG. 4 is a cross-sectional view of a portion of the assembly shown in FIG. 1 taken along lines 4—4 of FIG. 1 and in the direction of the arrows.

BEST MODE(S) FOR CARRYING OUT THE INVENTION

Figure 1:
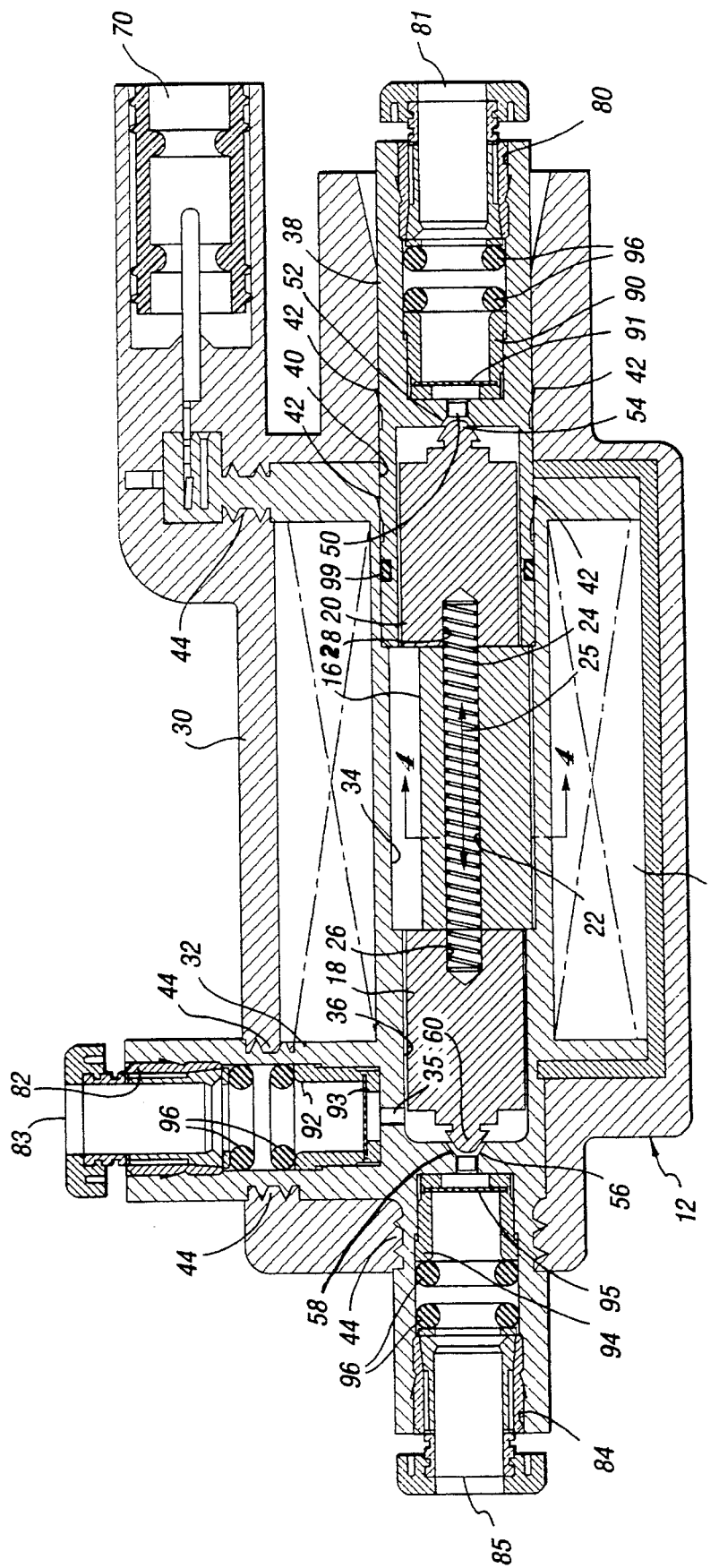
FIG. 1 is a cross-sectional view of an air suspension solenoid assembly incorporating the present invention.

The present inventive air suspension system is shown in FIGS. 1–4. The system is designated generally by the numeral 10 in FIGS. 2 and 3. The unique solenoid assembly used with the present inventive system is designated by the numeral 12 and shown in detail in FIG. 1.

The solenoid assembly 12 utilizes a single wound coil 14, a single pole piece 16 and a pair of armature members 18 and 20.

The pole piece 16 is shaped like a rod or tube and has the cross-sectional shape as shown in FIG. 4. The pole piece has an opening 22 through it and a coil spring 24 (or other biasing means) positioned in it. The coil spring 24 also extends into openings or bores 26 and 28 in armatures 18 and 20, respectively. As shown by arrow 25 in FIG. 1, when the solenoid is not energized, coil spring 24 biases armature members 18 and 20 outwardly away from the pole piece.

The solenoid assembly 12 includes an outer body or housing 30 which is positioned around an inner body member or bobbin 32. The solenoid coil 14 is positioned inside the housing 30 and external of the bobbin 32. The bobbin 32 has an inner stepped bore 34 in which the armatures 18 and 20 are positioned, along with the pole piece 16.

Armature 18 is slidingly positioned in end 36 of bore 34. Armature 20 is slidingly positioned in insert housing 38 which is positioned in the opposite end 40 of the stepped bore 34. In this regard, housing 38 has a plurality of locking tangs or ridges 42 on its outer surface which securely hold the housing 38 in the end 40 of the bore 34.

A plurality of moisture barriers 44 are positioned around the exterior of the bobbin 32 and housing 30 in order to prevent moisture from contaminating the inner components of the solenoid assembly 12. The moisture barriers can be of any conventional type.

A valve mechanism 50 is positioned in housing 38 and valve mechanism 56 is positioned in the end 36 of bore 34. Valve mechanism 50 includes a valve seat 52 in the housing 38 and a valve member 54 included as a protrusion on the end of armature 20. Valve mechanism 56 includes a valve seat 58 in the bobbin 32 at the end 36 of bore 34 and a mating valve member 60 included on the end of armature 18. When the solenoid is deenergized, the spring member 24 urges armatures 18 and 20 outwardly seating valve members 60 and 54 in valve seats 58 and 52, respectively. (This is shown in FIG. 3.) This seals the two valve mechanisms and prevents air from flowing through them.

Figure 2:
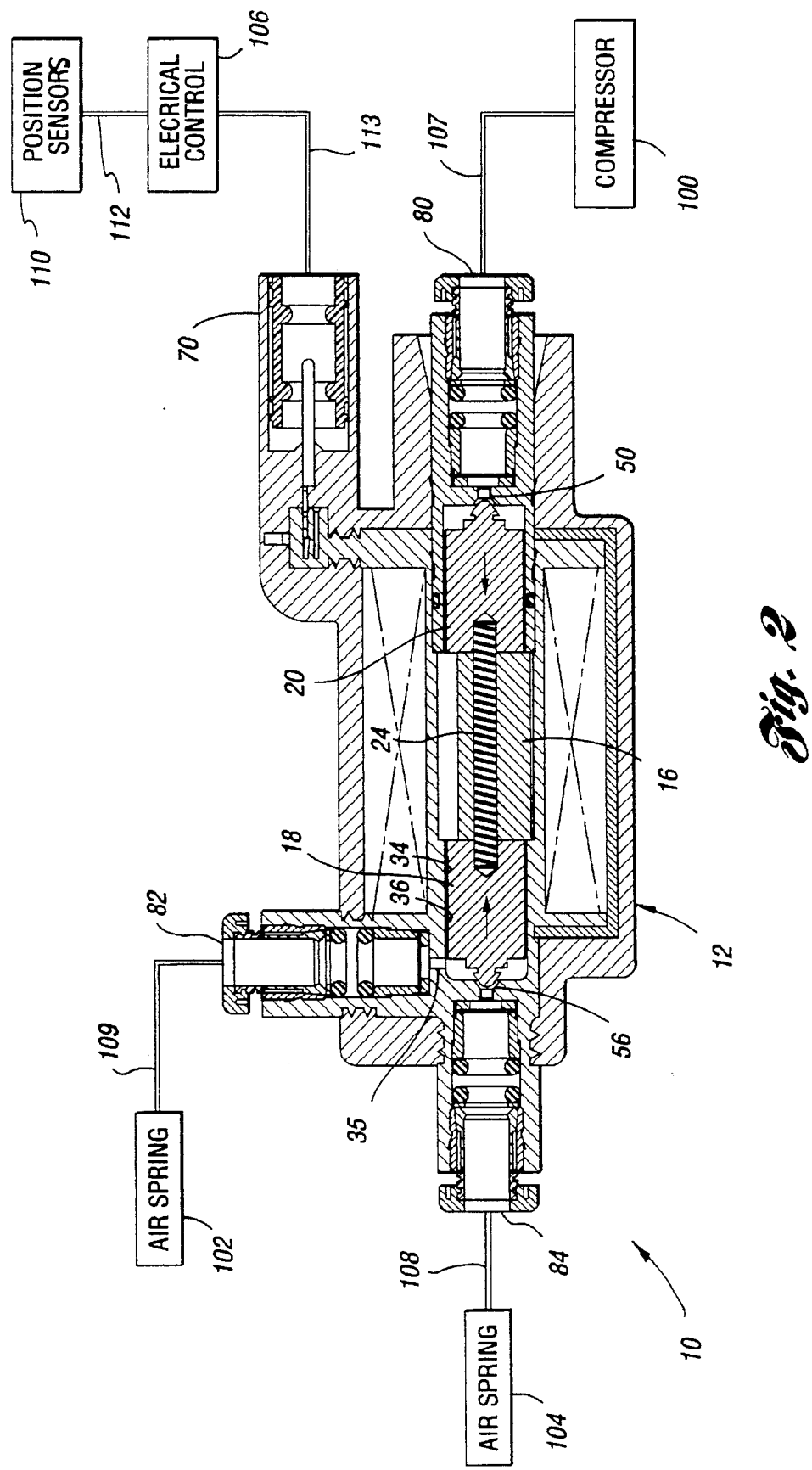
FIG. 2 is a schematic diagram of a system incorporating the present invention when the solenoid is energized.

On the other hand, when the coil of solenoid assembly 12 is energized, armatures 18 and 20 are pulled inwardly against the ends of pole piece 16 opening both of the valve mechanisms 50 and 56. (This is shown in FIGS. 1 and 2.)

This allows air to flow through the valve mechanisms and to the air suspension mechanisms at the wheels of the vehicles.

One or more electric terminals 70 are provided on the body 30 of the solenoid assembly 12 in order to connect the solenoid to the appropriate electronic or electrical control system of the vehicle.

Inlet port 80 is provided at one end of the housing 30 of the solenoid assembly 12. Outlet ports 82 and 84 are provided on the opposite end of the housing 30. Fittings 81, 83 and 85 are provided in the three ports 80, 82 and 84, respectively, in order to connect the housing to the air suspension system. The fittings 81, 83 and 85 can be of any conventional type.

Cup-shaped retainers 90, 92 and 94 are provided in the ports 80, 82 and 84, respectively. These containers hold filters 91, 93 and 95, respectively, which filter the air and other fluids as they enter and exit from the system. Preferably, the filters 91, 93 and 95 are nylon screens of conventional type.

A pair of O-rings 96 are provided in each of the ports 80, 82 and 84 in order to seal the ports. In addition, O-ring 99 is provided to seal the joint between the insert housing 38 and bobbin 32.

The operation of the present invention is illustrated in FIGS. 2 and 3. As shown in FIG. 2, the solenoid assembly 12 is connected to a compressor 100 at inlet 80, to air springs 102 and 104 at outlet ports 82 and 84, and to electronic control device 106 by terminal 70. Air compressor 100 introduces air into the solenoid assembly 12 through conduit 107 and valve mechanism 50. When coil 14 of the solenoid is energized, armature 20 is pulled against the pole piece 16 withdrawing the valve member 54 from the valve seat 52 thus allowing air from the compressor 100 to enter the solenoid assembly.

At the opposite end of the solenoid assembly 12, activation of coil 14 pulls armature 18 against pole piece 16 thus removing valve member 60 from the valve seat 58 and opening the valve mechanism 56. This in turn allows air introduced into the solenoid assembly by compressor 100 to be delivered to the air spring 104 through the valve mechanism 56. At the same time, air from the compressor 100 is introduced into valve spring 102 through exit port 82 from the end 36 of bore 34. In this regard, orifice 35 connects the bore 34 with port 82.

As shown in FIG. 2, when energy is supplied to the solenoid and the armatures 18 and 20 are moved against the tube 16, a flow path from the inlet or supply port 80 is opened directly to the two outlet ports 82 and 84. Thus, pressure is increased to both air springs 102 and 104 simultaneously until the desired vehicle height is reached. Also, pressure is equal throughout the system.

The activation of the solenoid coil is directed by the electronic control system 106 of the vehicle based on input from one or more position sensors 110. When the truck or other vehicle with the air suspension system is subjected to increased weight, the position sensor 110 submits signals to the electronic control 106 which in turn energizes the solenoid and opens the flow path from the air supply to the air springs.

In this manner, both sides of the vehicle are controlled from a leveling standpoint with one device, rather than two or more separate ones. This also keeps the vehicle level from front to rear.

The solenoid assembly 12 is preferably mounted on the frame of the vehicle and is connected to the air springs and compressor by appropriate conduits or tubing 107, 108 and 109. Also, appropriate electrical wires or conduits 112 and 113 are used to connect the position sensor 110 to electric control 106 and the electrical control 106 to the terminal 70.

When the solenoid assembly is deenergized (or not energized), the armatures 18 and 20 are moved outwardly by the spring 24 closing the valve members 50 and 56. This is shown in FIG. 3. This closes the path from the air compressor to the air springs and retains the suspension system at the desired air pressure and thus the vehicle at the desired height. This also prevents the air springs 102 and 104 from leaking to the atmosphere.

Also, armature 18 isolates air spring 104 from air spring 102. The level of isolation is determined by the spring force on the armature 18. Armature 20 isolates air spring 102, as well as any leakage from air spring 104, from the compressor 100.

As conventionally known, the line or conduit 108 from the compressor 100 to the inlet port 80 is vented to atmosphere by a conventional compressor solenoid (not shown).

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. An air suspension load leveling system for a vehicle comprising:

a solenoid assembly;

a first air spring connected to said solenoid assembly;

a second air spring connected to said solenoid assembly;

an air compressor connected to said solenoid assembly;

said solenoid assembly having a solenoid mechanism with a pole piece, a first armature member and a second armature member;

a biasing member for biasing said first and second armature members and preventing air from flowing through said solenoid assembly from said air compressor to said first and second air springs;

whereby energization of said solenoid mechanism allows air to flow from said air compressor to said first and second air springs for adjusting a pair of vehicle wheels simultaneously, and de-energization of said solenoid causes isolation of said first and second air springs, respectively.

2. A load leveling system for a vehicle comprising:

a solenoid assembly comprising a solenoid mechanism having a pole piece and a pair of armature members;

a source of fluid connected to said solenoid assembly;

a pair of suspension leveling mechanisms connected to said solenoid assembly for adjusting a pair of vehicle wheels simultaneously;

whereby activation of said solenoid mechanism allows fluid to flow through said solenoid assembly to said pair of suspension leveling mechanisms, and whereby deactivation of said solenoid mechanism prevents fluid from flowing to said pair of suspension leveling mechanisms and causes isolation of said pair of suspension leveling mechanisms, respectively.

\* \* \* \* \*